United States Patent [19]

Jourdain et al.

[11] Patent Number: 4,541,567
[45] Date of Patent: Sep. 17, 1985

[54] VARIABLE AREA NOZZLE VANE

[75] Inventors: Gerard E. A. Jourdain, Saintry Sur Seine; Marcel R. Soligny, Chevilly-Larue, both of France

[73] Assignee: Societe Nationale D'Etude et de Construction de Moteurs D'Aviation, Paris, France

[21] Appl. No.: 502,203

[22] Filed: Jun. 8, 1983

[30] Foreign Application Priority Data

Jun. 28, 1982 [FR] France .................. 82 11269

[51] Int. Cl.⁴ .................. B64C 15/02; F02K 1/30
[52] U.S. Cl. .................. 239/265.37; 60/271; 60/905
[58] Field of Search .................. 239/265.33, 265.35, 239/265.37, 265.39; 60/271, 905; 415/134, 148, 150, 210, 216; 428/594, 634; 52/84, 595

[56] References Cited

U.S. PATENT DOCUMENTS

| | | | |
|---|---|---|---|
| 2,794,317 | 6/1957 | Brown | 239/265.39 |
| 2,927,424 | 3/1960 | Hyde | 239/265.39 |
| 3,291,397 | 12/1966 | Johnson | 239/265.35 |
| 3,892,358 | 7/1975 | Gisslen | 239/265.39 |
| 3,976,269 | 8/1976 | Gupta | 428/594 X |

FOREIGN PATENT DOCUMENTS 2158625 3/1973 Fed. Rep. of Germany .................. 239/265.37

Primary Examiner—Abraham Hershkovitz
Assistant Examiner—Joseph M. Pitko
Attorney, Agent, or Firm—Oblon, Fisher, Spivak, McClelland & Maier

[57] ABSTRACT

A vane for a convergent-divergent nozzle is constituted by a central body and a base plate. The central body comprises a reinforcement substantially in the shape of an isoceles triangle and of channel section, the reinforcement having internal and external edge flanges and a cover plate of the same shape and dimensions as the reinforcement, the reinforcement being secured to the flanges of the latter.

The base plate is rectangular and has a triangular opening of a contour corresponding to that of the reinforcement. The central body is secured to the base plate by securing means constituted by a profiled member of a shape corresponding to that of the opening.

The central body is of a composite carbon-carbon material; the base plate and securing means, of steel.

7 Claims, 5 Drawing Figures

VARIABLE AREA NOZZLE VANE

BACKGROUND OF THE INVENTION

1. Field of the Invention

This invention relates to variable area nozzle vanes. The term "vane" is used herein to refer generally to blades, shutters and other plane or curved substantially laminar members.

2. Summary of the Prior Art

Vanes of variable area nozzles have, in general, a metal body to which are secured devices enabling the adjusting actuation of the vane, and a base plate of steel which protects the metal body from the hot gases of the jet confined by the nozzle and ensures fluid-tightness with respect to adjacent vanes. The base plate supports longitudinally thereof a projection of triangular shape which enables the formation of an aerodynamic profile with the adjacent blades, and also serves cooling purposes.

The need to lighten such structures leads to the replacement at least partially of the components of the nozzle, generally of steel, by lighter materials, such as structures of the sandwich or alternatively honeycomb type. The problem then arises of providing a connection between the two materials having different coefficients of expansion and liable to be subjected to different temperatures. French Pat. No. 2,397,534 shows a joint or seal between the downstream ends of the divergent vanes, subject to the hot gas flow from the engine, and the downstream ends of the outer vanes which are subject to the external ambient temperature. The joint or seal comprises at least one elongate slot, of which the axis is approximately parallel to the genatrix of the divergent vane, in which the pivot is capable of being displaced longitudinally, the slot and the pivot each being fixed to a respective vane. No indication is given in this prior patent specification regarding securing together of the longitudinal edges of these vanes.

This previously proposed arrangement has, moreover, as its objective the facilitating of the relative displacement of a divergent vane with respect to an outer vane during changes in the configuration of the convergent-divergent blade assemmbly, the distance separating the upstream end of the convergent vanes and the downstream ends of the divergent vanes being variable in accordance with the profile which is required.

An object of the present invention is to provide a variable area nozzle vane of lightweight but capable of accommodating temperature differentials and providing for ready sealing and connection with adjacent vanes.

SUMMARY OF THE INVENTION

According to the present invention there is provided a vane for incorporation in a variable section ejection nozzle, said vane comprising a central body including means defining a reinforcement substantially of isoceles triangle shape with rounded apex and of channel cross-section with flanges extending from each limb of the channel substantially at right angles to the respective limb, one said flange forming an external boundary of the reinforcement and the other said flange forming an internal boundary of the reinforcement, and means defining a cover plate with external dimensions substantially corresponding to the said external boundary of the reinforcement, a rectangular base plate of sheet material having a generally triangular opening lying across the longitudinal axis thereof with a contour corresponding to the internal profile of the outer flange of the central body, and securing means serving to hold the portion of the central body against the base plate around the substantially triangular opening.

Figure 1:
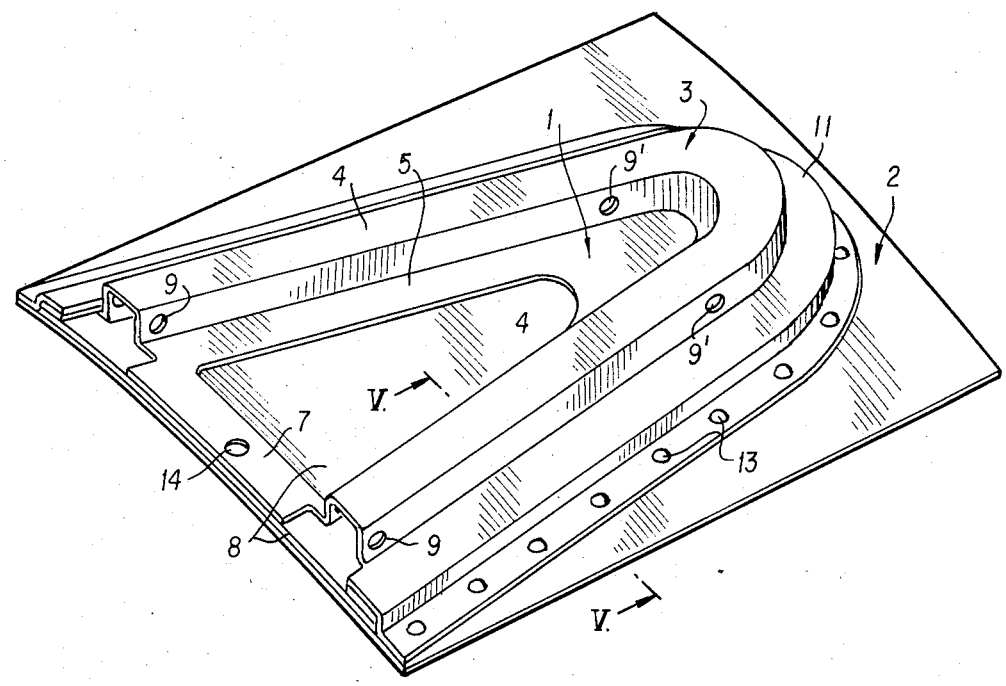
FIG. 1 is a perspective view from above of one embodiment of a vane in accordance with the invention.

Referring now to the drawings, a vane is shown in perspective and in its component parts. Although the term "vane" has been used it would also be appropriate to term the part concerned a shutter or a blade. The vane illustrated is intended to form a component of an ejection nozzle of variable cross-sectional area and comprises at least two main parts: a central body 1 and a base plate 2.

Figure 2:
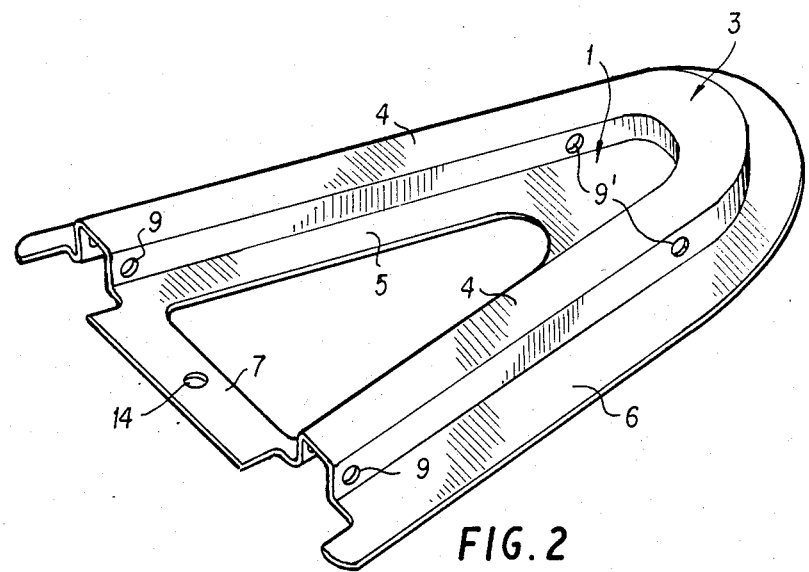
FIG. 2 is a perspective view from above of a first part of a central body of the vane of FIG. 1.
Figure 3:
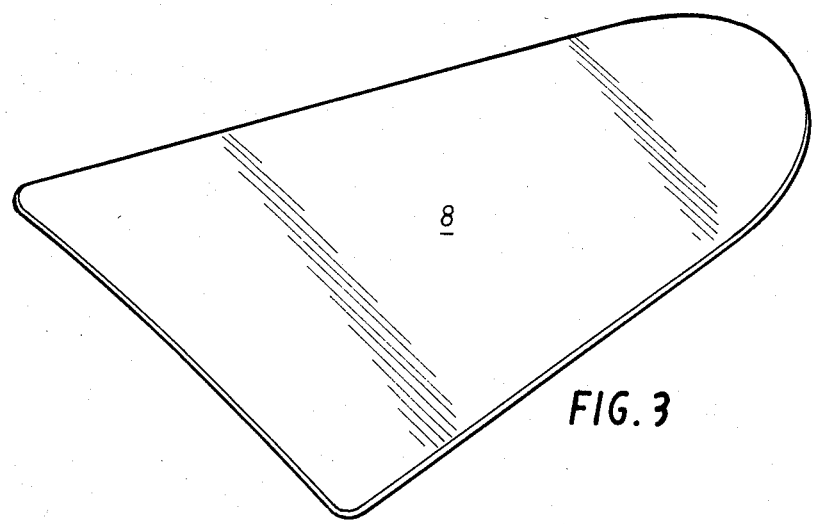
FIG. 3 is a perspective view from above of a second part of the central body of the vane of FIG. 1.

The central body shown separately in FIG. 2 comprises at least two parts:

(i) A reinforcement rib 3 having, seen from above, the shape of two sides of an isoceles triangle with rounded apex; the equal sides 4 have a section approximately of channel or U-shape the edge of each of the limbs or branches of the channel extended perpendicularly to that limb or branch as a flange 5,6. The flange 5 defines in relation to the U an internal edge and the flange 6 an external edge. Both flanges lie in the same curved surface as a transverse bridge 7 forming the base of the triangle, this surface having for example, in the upstream transverse plane of the array of vanes a radius of curvature corresponding to the radius of the duct preceding the nozzle;

(ii) A plate 8 (FIG. 3) having the shape and the external dimensions of the plane projection of the reinforcement rib and of its flange 6 and which is secured, for example by adhesive to the flanges 5 and 6 and to the transverse bridge 7 in order to form a rigid box.

Mutually coaxial apetures 9, provided at the upstream end in the lateral sides of the reinforcement rib, receive metal pins intended as pivot axes for the vane and similar mutually coaxial apertures 9', further downstream, likewise receive pins of the adjustment movement control devices.

Figure 4:
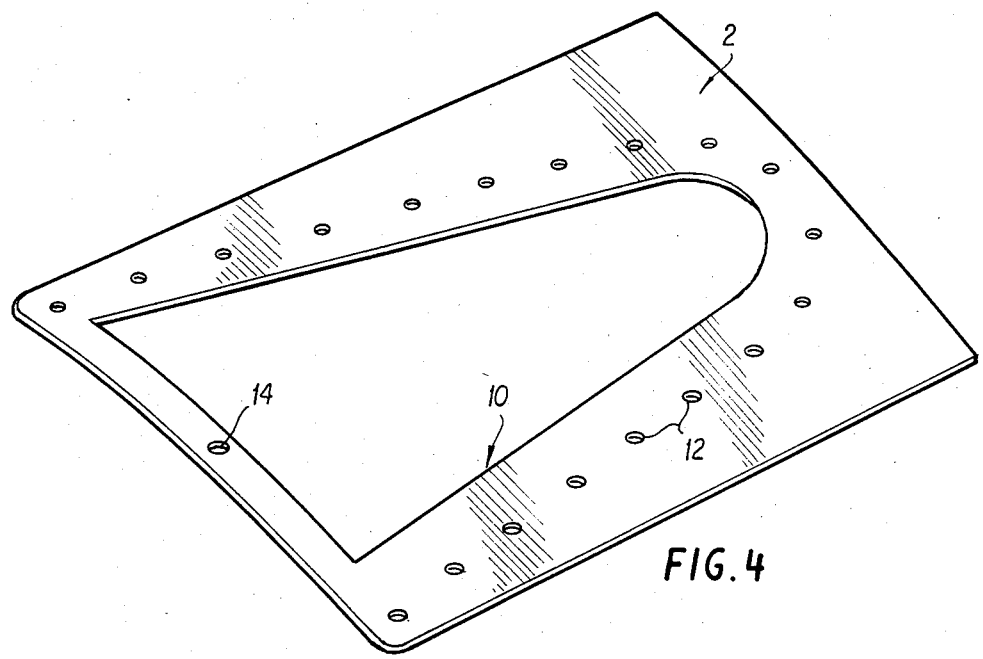
FIG. 4 is a perspective view from above of a base plate of the vane.

The base plate 2 (FIG. 4) is formed by a metallic rectangular part, longitudinally curved on a radius of curvature corresponding to the radius of the nozzle. A generally triangular opening 10 of a contour corresponding to the profile of the outer limbs 4 of the reinforcement rib 3 of the central body 1, is provided on the longitudinal axis of the vane.

Figure 5:
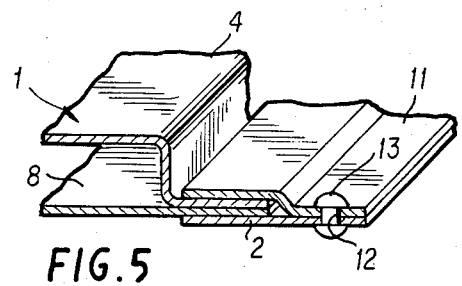
FIG. 5 is a fragmentary section, to an enlarged scale, on line V—V of FIG. 1.

Securing means constituted by a profiled member 11 of metal, having a shape similar to the profile of the opening 10, cooperates with the base plate 2 in order to secure the external flange 6 of the central body 1. The profile member 11 has a section as shown in FIG. 5 with two parallel portions, off-set one with respect to the other, and connected at their adjacent edges by a transverse portion, which may for example, be perpendicular to the main portions. Apertures 12 are provided in the edge portion defining the opening 10 and also in the profiled member and these apertures receive, for example securing rivets 13.

The controlled securing of the edge portions of central body 1 of a composite material by the profiled member 11 on the base plate 2 of steel, enables differential expansion of the two assemblies without giving rise to harmful stresses.

There is, moreover, provided securing means 14, on the axis of symmetry, operative between the transverse bridge 7 of the central body 1 and the base plate 2 so as to avoid possible sliding movements which may arise at certain temperatures. The securing means is, for example a rivet.

The advantage of a substantial saving in weight obtained by the use of vanes in accordance with the invention whilst at the same time accommodating various conditions imposed by incorporation in an ejection nozzle is particularly valuable in the case where they constitute the external vanes of the nozzle, termed "cold" vanes.

The vane construction in accordance with the invention is also suitable when the constituent parts are of the same material, but subject to different temperatures, giving rise as a result to dimension variations which are liable to give rise to inadmissible stresses.

It will be apparent that the use of parts only of a composite material for example carbon-carbon for the manufacture of the nozzle vanes, will give rise to an ideal solution with maximum reduction in weight. This solution can be retained in the application of the invention to vanes for secondary flow inversion in a twin flow turbo-reactor. However, the use of blades of metal and a composite material, for example with the base plate 2 and securing means 11 of metal, all the other parts, except the rivets being of composites, in accordance with the invention will give rise to:

(i) an improvement in the fluid-tightness, the steel base plates on steel having greater flexibility and an improved adaptability which will not arise with a composite-on-composite construction; and (ii) an improved continuity by avoiding an accentuated profile like "risers of a staircase" between vanes, since the use of carbon-carbon will involve greater thicknesses.

In certain uses, it can be advantageous to maintain these advantages by associating vanes with a base plate of metal and remaining structure of composite, (for example carbon-carbon) in accordance with the invention and vanes of integral carbon-carbon material, for example one vane in two of each type.

We claim:

1. A vane for incorporation in a variable section ejection nozzle, said vane comprising
    a central body including
        means defining a reinforcement substantially of isoceles triangle shape with rounded apex and of channel cross-section with flanges extending from each limb of the channel substantially at right angles to the respective limb, one said flange forming an external boundary of the reinforcement and the other said flange forming an internal boundary of the reinforcement, and
        means defining a cover plate with external dimensions substantially corresponding to the said external boundary of the reinforcement, a rectangular base plate of sheet material having
    a generally triangular opening lying across the longitudinal axis thereof with a contour corresponding to the internal profile of the outer flange of the central body, and
    securing means serving to hold the edge portion of the central body against the plate around the substantially triangular opening.

2. An vane according to claim 1, wherein the securing means comprise at least one profiled member of a shape corresponding to the profile of the opening in the base plate and having in cross-section two parallel, offset, portions connected at their adjacents edges by a transverse portion, said profiled member being secured to the base plate by one said off-set portion, the other off-set portion engaging over and thereby securing the outer flange of the reinforcement and the cover plate.

3. A vane according to claim 2 wherein the central body is of carbon-carbon composite and the base plate and securing means are of steel.

4. A vane according to claim 1, wherein the central body is of a carbon-carbon composite and the base plate and the securing means are of steel.

5. A vane according to claim 1 wherein a transverse bridge of the central body and the base plate are held together by at least one securing device.

6. A vane according to claim 1 wherein the limbs of the channel section reinforcement have coaxial apertures for pivot pins of the vane and similarly coaxial apertures for the pivot pins of the control means of vane.

7. A vane for incorporation in a variable section nozzle, said vane comprising
    a central body of sheet material including
        means defining a reinforcement substantially of isoceles triangle shape with rounded apex and of channel cross-section with flanges extending from each limb of the channel substantially at right angles to the respective limb, one said flange forming an external boundary of the reinforcement and the other said flange forming an internal boundary of the reinforcement, and
        means defining a cover plate with external dimensions substantially corresponding to the said external boundary of the reinforcement and having a peripheral edge portion, a rectangular base plate of sheet material having
    a generally triangular opening spanning the longitudinal axis thereof with a contour corresponding substantially to the internal profile of the outer flange of the central body and,
    a stepped, strip-like member having a shape conforming to the periphery of the cover plate and to the outer periphery of the reinforcement, the outer edge portion of the strip-like member being secured to member engaging over the peripheral edge portion of the cover plate and at least a portion of the outer flange of the reinforcement, the engagement serving to secure the reinforcement and the cover plate to the base plate while permitting relative thermal expansions to take place without over-stressing.

* * * * *